No. 744,142. Patented November 17, 1903.

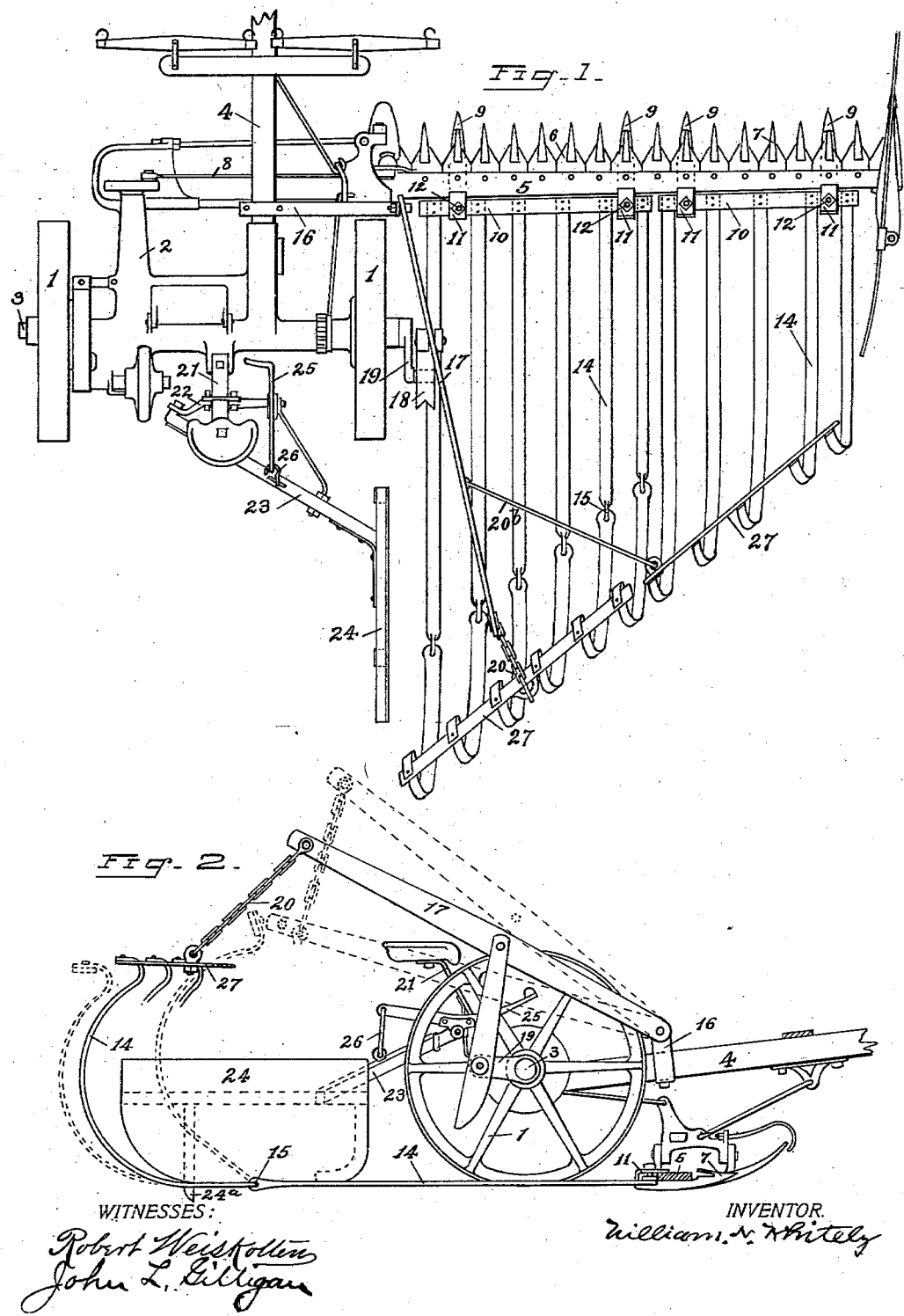

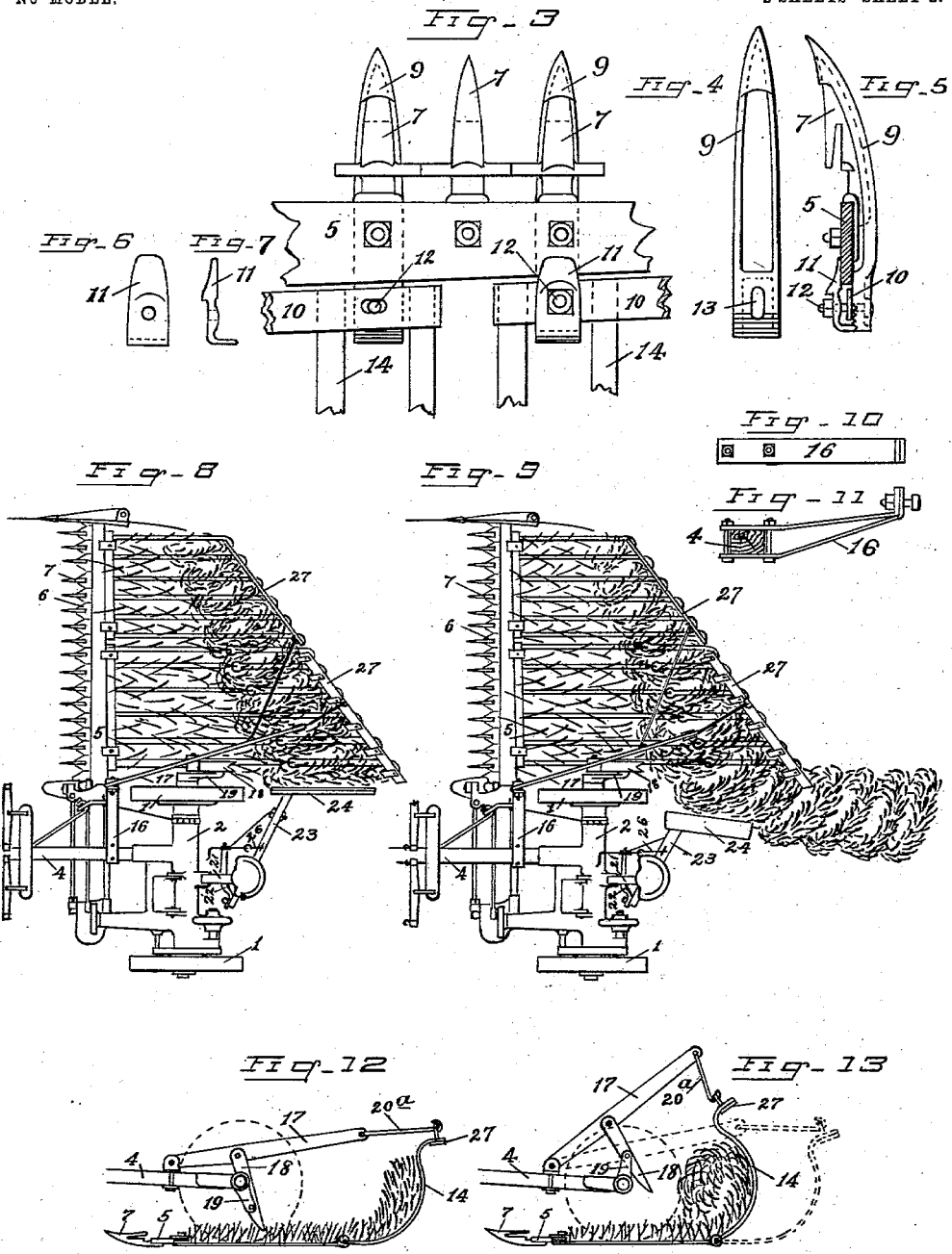

UNITED STATES PATENT OFFICE.

WILLIAM N. WHITELY, OF SPRINGFIELD, OHIO.

HARVESTING-MACHINE.

SPECIFICATION forming part of Letters Patent No. 744,142, dated November 17, 1903.

Application filed May 4, 1903. Serial No. 155,679. (No model.)

*To all whom it may concern:*

Be it known that I, WILLIAM N. WHITELY, a citizen of the United States, residing at Springfield, in the county of Clark and State of Ohio, have invented certain new and useful Improvements in Harvesting-Machines, of which the following is a specification, reference being had therein to the accompanying drawings.

My invention relates to improvements in harvesting-machines; and it consists in a side-delivery crop gathering and discharging attachment secured to the finger-bar in rear thereof and is adapted to any make of harvesting-machines to gather the crop as cut and discharge the same at the stubbleward side of the attachment and in rear of the truck portion of the machine either in windrows in the line of travel of the machine or crosswise thereto out of the path of the team and machine when cutting the next swath or is adapted to deliver same in bunches in rear of the machine instead of in a continuous windrow. By my attachment the cut crop is delivered and left upon the ground in a loose and uncompacted condition, not having been trampled down by the team or machine passing over same, that the sun and air may readily penetrate and dry the same quickly as the cut crop in gathering is rolled on the platform, so that the butts of the grain or grass crop are outward and exposed to the action of the air and sun for drying quickly.

In side-delivery grain and grass gathering and discharging attachments for harvesting-machines heretofore made much difficulty has been experienced in discharging the cut crop from the slatted platform. As the slats of the platform were not provided with means for agitating same, the cut crop as accumulated on the platform would compact against the slats, so as to make it very difficult, if not impossible, to discharge same from the slatted platform when desired. This is especially the case when the crop to be cut is wet, green, or the wind blowing from the stubbleward side of the machine or when cutting upon hillsides, when the grassward end of the cutting apparatus is inclined downward. Under these conditions as harvesting-machines are now constructed the cut crop will not be discharged from the platform, but will accumulate and clog the machine, rendering same inoperative.

One of the objects of my invention is to overcome these difficulties and defects and to provide a crop gathering and discharging attachment for harvesting-machines with means for agitating the rearward curved-upwardly ends of the slats of the platform, so as to prevent any possibility of the accumulated cut crop as collected on the platform from catching and hanging onto the slats of the platform incident to side-delivery crop gathering and discharging attachments for harvesting-machines as now constructed, which have no means provided for agitating the accumulating crop on the platform and discharging same freely therefrom.

In my construction the stalks as they accumulate on the platform are pushed up on the curved-upwardly portion of the slats by the action of the stubble on the incoming portion of the crop, and ordinarily a rolling movement is produced by which the stalks are formed into a roll, and by the oblique form of the rearmost portion of the slatted platform the crop may be delivered at the stubbleward side of the platform as the machine moves forward. It has been found that by agitating the crop as it is gathering against the curved-upwardly portion of the slatted platform by raising a predetermined number of the slats of the slatted portion and turning them forward and preferably stubbleward the crop as accumulating will thereby easily roll obliquely to the travel of the machine and be readily discharged. This raising and lowering and turning the rearward part of the slats also frees the stalks which accumulate between the slats of the platform that would otherwise obstruct the sidewise sliding and rolling motion necessary to discharge the crop at the stubbleward side of the platform in a rolled condition. I attain these objects by the mechanism illustrated in the accompanying drawings, which form a part of this specification, in which—

Figure 1 is a plan view of a harvesting-machine equipped with my invention. Fig. 2 is a side elevation of same, taken from the grassward side of the machine, the heavy lines showing the position of the vibrating lever and curved-upwardly portion of the slats of the platform in their normal working position, the dotted lines showing the position of the vibrating lever and jointed portion of the curved-upwardly ends of the slats of the platform when they are at their farthermost points forward and rearward. Fig. 3 is a plan view of a section of the finger-bar with guard-fingers and transverse bars thereto attached. Fig. 4 is a plan view of the overshoe, showing the elongated slot in its rear end by means of which it can be connected to the finger-bar of any make of harvesting-machine now made. Fig. 5 is a side elevation of same, showing the manner of connecting same to the guard-finger and finger-bar. Fig. 6 is a plan view of the clamp which connects and holds the overshoe and transverse bar of the slatted platform to the finger-bar. Fig. 7 is a side elevation of same. Fig. 8 is a plan view of a harvesting-machine equipped with my invention, showing the cut crop accumulating, gathering, and rolling on the slatted platform, where it is held by the gate located at the stubbleward side of said platform. Fig. 9 is a plan view of a harvesting-machine equipped with my invention, showing the gate located at the stubbleward side of said platform raised and the cut crop discharging from the slatted platform in a rolling condition. Fig. 10 is a plan view of the tongue-clamp which forms a support for the forward end of the vibrating lever. Fig. 11 is a side elevation of same. Fig. 12 is a side elevation of a portion of a harvesting-machine equipped with my invention, showing the crop accumulating on said platform and contacting with the curved-upwardly ends of the slats of said platform, the slats of the platform being in their normal working position and not acted upon by the vibrating lever. Fig. 13 is a side elevation of a portion of a harvesting-machine equipped with my invention, the heavy lines showing the rearward portion of the slats of the stubbleward section of the slatted platform drawn forward by the vibrating lever to agitate and roll the accumulating crop on the platform, so as to discharge the crop freely from the platform, the dotted lines showing the position of the vibrating lever and rearward portion of the slats of the stubbleward portion of the slatted platform when in their normal working position.

The harvesting-machine shown in the drawings is of the ordinary two-wheeled hinged-bar mowing-machine type. Hence it is not necessary to describe same in detail, as it is evident my invention is adapted to and can be readily attached to any kind or make of harvesting-machine.

Referring to the drawings, 1 1 represent the main driving and supporting wheels. 2 represents the main frame, located between said driving and supporting wheels 1 1. 3 represents the main axle, passing through said frame 2 and supported by the main driving and supporting wheels 1 1.

4 represents the pole or tongue of the machine, which is rigidly secured to the main frame 2. 5 represents the finger-bar, which is attached to and supported by said frame 2. 6 represents the reciprocating knife. 7 represents the guard-fingers, secured to said finger-bar 5.

8 represents the pitman, which communicates motion to the reciprocating knife.

The above parts are of the usual or ordinary type common to all machines.

Secured to said finger-bar 5 by means of the overshoe 9, fitting over the point of the guard-finger 7 and extending rearwardly, are the transverse bars 10 10, which are held to said finger-bar 5 by means of the clamps 11, which bind and hold said overshoe 9 securely to said finger-bar 5 by means of the bolt 12, which passes through the slot 13, which is provided in the rearward portion of said overshoe 9, to accommodate itself to the different-width finger-bars, and loosely through said transverse bar 10, holding said parts 9 and 10 to said finger-bar 5, and while the slatted platform is attached to the finger-bar 5 I prefer to make the apertures in the ends of said transverse bars 10 10 for the bolt 12 sufficiently large, so as to allow the rearward ends of the slats 14 to freely rise and fall in passing over the ground. Rigidly attached at their forward ends to said transverse bars 10 10 are a series of slats 14, which extend rearwardly, their rearward ends curved upwardly, forming a slatted platform which slides on the ground for the reception of the cut crop, said platform being formed in longitudinal sections, the rearward ends of the slats of the forward portion of the stubbleward section of the slatted platform being connected to the forward ends of the rearward portion of said slats by means of a series of hinges 15, as shown in Figs. 1 and 2, so as to allow the rearward ends of the slats 14 of the stubbleward section of said platform to be raised and lowered to agitate the cut crop and assist in discharging same from said slatted platform as the machine moves forward; but, as heretofore stated, the rearward ends of all of the slats of the platform may be constructed to be raised and lowered for the purposes herein stated.

Rigidly connected to the tongue or pole 4 in any suitable manner is the clamp 16, which extends grassward from said tongue or pole 4. To the grassward end of said clamp 16 is pivotally connected the vibrating lever 17, which is journally mounted on the upward end of the rake 18, said rake being journally mounted on the crank 19, which is secured to the hub of master-wheel 1 or to the axle 3, said rake having an orbital movement to engage with, lift, and move the cut crop rearward on the slatted platform, as shown in Figs. 12 and 13. Pivotally secured to the rearward end of the vibrating lever 17 is the link 20 20$^b$, the link 20 pivotally connecting the upwardly-curved ends of the teeth of the section of the slatted platform on the stubbleward side of the machine to the lever 17, the link 20ᵇ pivotally connecting the upwardly-curved ends of the teeth of the section of the slatted platform on the grassward side of the machine to the lever 17, so that at every revolution of the driving and supporting wheels 1 1 the rearward ends of the slats 14 of the slatted platform are moved forward, upward, and rearward, agitating and assisting in rolling the accumulated cut crop on said platform, so as to release the cut crop from said slats 14 and discharge same freely from said platform.

Rigidly secured to the seat-support 21 is the clamp-bracket 22, which forms a support for the stubbleward end of the gate-arm 23, to the grassward end of which is connected the gate 24, located and operating at the stubbleward side of said platform. To said gate 24, near its rearward end, is secured a downwardly-projecting hook 24ᵃ, as shown in Fig. 2, the point of which extends below the bottom edge of said gate to separate the cut crop or draw it to the next cross-windrow if it is not divided when said gate 24 has been dropped down. On the grassward end of the clamp-bracket 22 is pivotally mounted the lever 25, which extends rearwardly and connects to the gate-arm 23 by means of the pivotal link 26, and when desired by the operator to discharge the cut crop accumulated on the slatted platform in bunches in the wake of the machine instead of in windrows by pressing down on the lever 25 the gate 24 is raised a sufficient height to allow the accumulated crop to pass off said platform under said gate 24 and is delivered stubbleward of said platform, and when a sufficient quantity of the accumulated cut crop has been deposited from the platform in rear of the machine by releasing the pressure on the lever 25 the gate 24 is allowed to drop and prevents the further passage of the cut crop from the platform.

In the operation of a harvesting-machine equipped with my improvement by means of the connection of the vibrating lever 17 to the hub of the master-wheel 1 or main axle 3 and the connection of said vibrating lever 17 to the rearward ends of the stubbleward portion of the slatted platform it will be observed that at each revolution of the driving and supporting wheels 1 1 the rearward portion of the slats of said platform are drawn upward, forward, and downward, so as to agitate, roll, and free the accumulated crop thereon from contact with the slats of said platform and allow the accumulated cut crop to freely pass from said platform in a rolling condition stubbleward from said platform with the butts of the cut crop extending outward and the grain left on the ground in the rear of the truck of the machine in an uncompacted condition to admit the free passage of the air therethrough. When it is desired to deposit the cut crop in bunches in rear of the truck portion of the machine at the stubbleward side of the slatted platform instead of in a continuous windrow, as shown in Fig. 9, it can be accomplished by raising the gate 24 by means of the lever 25 when a sufficient quantity of the cut crop has accumulated on the platform to make the size bunch desired and lowering said gate 24 when a sufficient quantity has been deposited by releasing the pressure on said lever 25. It will be observed that the rake 18, which is mounted on the crank 19, at every revolution of the driving and supporting wheels 1 1 moves forward and rearward by the motion of said crank 19 and gathers, lifts up, and moves rearward the cut crop that has accumulated or is accumulating at the stubbleward side of the slatted platform, acting on said cut crop similar to a tedder, so as to prevent any clogging of the crop at the stubbleward side of the slatted platform. It will also be observed that I connect the rearward ends of the slats of each section of the slatted platform by means of a link 27 27, as shown in Figs. 1, 8, and 9, so as to move said bars in unison when desired and that the movement of any one of said slats may control the movement of the others and that the slats of the platform are shorter in the line of their length at the grassward end of the platform than those at the stubbleward end of said platform, thus presenting an oblique wall against which the accumulating crop on the platform comes in contact as the machine moves forward and rolls and starts the accumulating cut crop stubbleward on said platform.

While I have shown two forms of construction for the link 20 and 20ᵃ, connecting the rearward end of the vibrating lever 17 to the link 27, secured to the rearward ends of the slats 14, I prefer to construct said link as shown in Figs. 12 and 13 and designated thereon by the reference-numeral 20ᵃ, although I find both constructions practical.

I prefer to make the slatted platform in longitudinal sections that the slats may more easily follow the undulations of the ground, each section being free to rise and fall independently of the other and for convenience in transportation, and one or both sections of said slatted platform are provided in their length with a hinge-joint connection of the slats. The hinge-joint should be so constructed that the spaces between the slats extend from front to rear that the stubble may act to hold the cut crop while the machine moves forward and force it against the rearward curved-upward ends of the slats of the slatted platform. Means are provided to raise the rearward portion of a predetermined number of the slats of the slatted platform and turn it forward upon said hinge-joints of said slatted platform to help roll the accumulated crop as it is forced upward, forward, and downward. These jointed connections of the slatted platform may be arranged obliquely across the platform or at right angles thereto. It is preferable to use jointed connections of the slats; but the movement can be made without the hinge-joint connections of the slats by bending the slats, as they may be elastic. A link connects the rear ends of said slats to the vibrating lever that when a portion of the slatted platform is seated in the stubble and the rearward portion is in its normal curved-upwardly position for gathering the crop it is held from further rearward movement and the platform can follow up and down the undulations of the ground, this link being nearly horizontal a portion of the time and permitting of this movement; but as the vibrating lever for raising and lowering the rearward end of the slatted platform is moved upward the link changes its position by first drawing the rearward end of the platform forwardly until it rises vertically to a certain extent. This operation is continuous that the movement upon the slatted platform is intermittent or at intervals, determined as shown by the revolution of the master-wheel, the rearward end of the slatted platform being raised and lowered once every revolution of said master-wheel. A crank is provided upon the hub of the master-wheel or axle. Upon this crank is a pitman connection to said lever for moving the rearward part of the lever and in turn the platform back and forth and up and down. The lower portion of said pitman is fashioned into a rake form and acts to move the crop rearwardly and upwardly, agitating and loosening up the crop similar to a tedder, so as to leave the cut crop in the windrow in a loose condition for drying.

Where it is not desired to windrow the cut crop in a continuous swath, but to break it in bunches and windrow it across in an opposite direction, a gate is provided pivotally connected with the truck part of the machine and a foot or hand lever adapted to raise and lower said gate to admit of the discharge of the cut crop when desired. This gate is preferably connected, as shown in Figs. 1, 2, 8, and 9, to the seat-support and in raising and lowering moves in a vertical and angular direction—i. e., as it moves upward it also moves sidewise from the platform; but said gate may be connected to any other part of the machine that will give it the desired movement. One object of this oblique movement is that said gate will not come in contact with the oblique movement of the rearward stubbleward topmost portion of said platform when it is moved forward and stubbleward to assist in rolling the cut crop. The forward portion of the vibrating lever for the rearward portion of the slatted platform is connected with an arm from the tongue or pole of the machine. While I have shown an automatic means for agitating the rear of said slatted platform for raising it up and turning it forward at intervals for the purpose stated, it is obvious that other and different mechanical means from those shown and described may be employed for that purpose or by the operator's hand or foot movement to effect the same purpose.

What I claim as my invention, and desire to secure by Letters Patent, is—

1. In a harvesting-machine, in combination, a finger-bar, a slatted platform connected to said finger-bar and adapted to slide on the stubble, its stubbleward side longer than its grassward side, its forward part adapted to slide on the stubble, the rearward ends of the slats of said platform curved upwardly to collect the crop, means to raise and lower the rearward part of a predetermined number of the slats of said platform as the machine moves forward to assist in rolling the crop forward and sidewise to deliver same to the stubbleward side of said platform.

2. In a harvesting-machine, in combination, a finger-bar, guard-fingers connected thereto, an overshoe adapted to fit over the point of the guard-finger and extending rearwardly of the finger-bar, a slatted platform, including a cross-bar connected to said finger-bar, the forward ends of the slats of said platform rigidly connected to said cross-bar, an aperture in said cross-bar, a screw-threaded clamping-bolt fitting loosely therein, a clamping device for said cross-bar, its rearward end bearing upon the rearward end of said overshoe, its forward end bearing upon the finger-bar, said cross-bar loosely fitting between said clamping device and said overshoe, said screw-threaded clamping-bolt passing through said overshoe, said cross-bar and said clamping device to hold the several parts together and admit of free up-and-down movement of the rear ends of said slatted platform.

3. In a harvesting-machine, in combination, a finger-bar, a sectional slatted platform, including a cross-bar connected to said finger-bar, the forward ends of the slats of each section of said platform rigidly connected to one of said cross-bars, said slatted platform adapted to slide on the stubble, each section free to rise and fall independently of the other as the machine moves forward, the rearmost ends of the slats of said platform curved upwardly and arranged obliquely across the line of forward travel of the machine to discharge the crop stubbleward as the machine moves forward.

4. In a harvesting-machine, in combination, a finger-bar, a slatted platform connected to said finger-bar and adapted to slide on the stubble, a predetermined number of the slats of said platform being each composed of two portions jointed together, mechanically-operating means to continuously raise and lower the rearward part of a predetermined number of the slats of said platform, about said jointed connection of said slats as the machine moves forward for the purpose of turning the crop forward and downward to give it a rolling movement.

5. In a harvesting-machine, in combination, a finger-bar, a slatted platform connected to said finger-bar and adapted to slide on the stubble, the stubbleward slats longer than the grassward slats, the rear ends of the slats of said platform curved upwardly, a mechanically-vibrated lever pivotally mounted upon the truck part of the machine at the stubbleward side of the platform, a connecting mechanism from said lever to the rearward part of a predetermined number of the slats of said platform to continuously raise and lower the rearward part of said slats as the machine moves forward to move the crop stubbleward.

6. In a harvesting-machine, in combination, a finger-bar, a slatted platform connected to said finger-bar and adapted to slide on the stubble, the rearward ends of the slats of said slatted platform curved upwardly and arranged obliquely across the line of forward travel of the machine to roll the crop stubbleward as the machine moves forward, a vibrating lever connected with the rearward ends of a predetermined number of said slats of said platform, its opposite end pivotally connected to the truck part of the machine, a crank adapted to move said lever to raise and lower the rearward part of said slats of said platform as the machine moves forward to assist in discharging the crop.

7. In a harvesting-machine, in combination, a finger-bar, a slatted platform connected to said finger-bar and adapted to slide on the stubble, the rearward ends of the slats of said platform curved upwardly and arranged obliquely across the line of forward travel of the machine, means to raise and lower the rearward ends of a predetermined number of the slats of said platform as the machine moves forward to discharge the crop stubbleward, a gate located at the stubbleward side of said platform, an arm of said gate pivotally connected to the machine, a lever pivotally connected to the machine and connected to said arm and adapted to move said gate to and from said platform to gather and discharge the cut crop.

8. In a harvesting-machine, in combination, a finger-bar, a slatted platform connected to said finger-bar and adapted to slide on the stubble, the rearward ends of the slats of said platform curved upwardly and arranged obliquely across the line of forward travel of the machine, means to raise and lower the rearward ends of a predetermined number of the slats of said slatted platform as the machine moves forward to discharge the crop stubbleward, a gate located at the stubbleward side of said platform, a seat-support attached to the machine, an arm of said gate pivotally connected to said seat-support and extending rearward and grassward, a foot-lever connected with said seat-support and said arm of said gate to raise said gate to discharge the crop.

9. In a harvesting-machine, in combination, a finger-bar, a slatted platform connected to said finger-bar and adapted to slide on the stubble, a predetermined number of said slats of said platform being each composed of two portions jointed together to admit of the raising and lowering of a rearward part of the slats of said platform, a vibrating lever pivotally connected with the tongue part of the machine, a link, one end connected to said lever, its other end connected to the rearward part of said platform, a crank connected with said lever to operate it to raise and lower the rearward end of said slatted platform as the machine moves forward to assist in discharging the crop by a rolling motion.

10. In a harvesting-machine, in combination, a finger-bar, a slatted platform connected to said finger-bar and adapted to slide on the stubble, a lever-and-link connection between the rearward end of said platform and the truck part of the machine, a crank connected to the master-wheel or axle to operate the lever to raise and lower said rearward ends of a predetermined number of the slats of said platform, to move the crop for the purposes set forth.

11. In a harvesting-machine, in combination, a finger-bar, a slatted platform connected to said finger-bar and adapted to slide on the stubble, the rearward part of the slats of said platform curved upwardly, the slats at the stubbleward side of said platform longer than those at the grassward side of said platform, an adjustable gate constructed with a continuous bottom edge, said gate located on the stubbleward side of said platform, a downwardly-projecting hook on said gate near its rearward end and extending below the bottom edge of said gate to separate the cut crop as the machine moves forward.

12. In a harvesting-machine, in combination, a finger-bar, a slatted platform connected to said finger-bar and adapted to slide on the stubble, a rake 18 located at the stubbleward side of said platform, mechanical means for moving said rake downward, backward, upward and forward to engage with the cut crop upon said platform, tedder-like, and deliver it in a loose condition from said platform.

In testimony whereof I affix my signature in presence of two witnesses.

WILLIAM N. WHITELY.

Witnesses:
FRANK M. KRAPP,
JOHN L. GILLEGAN.